United States Patent Office

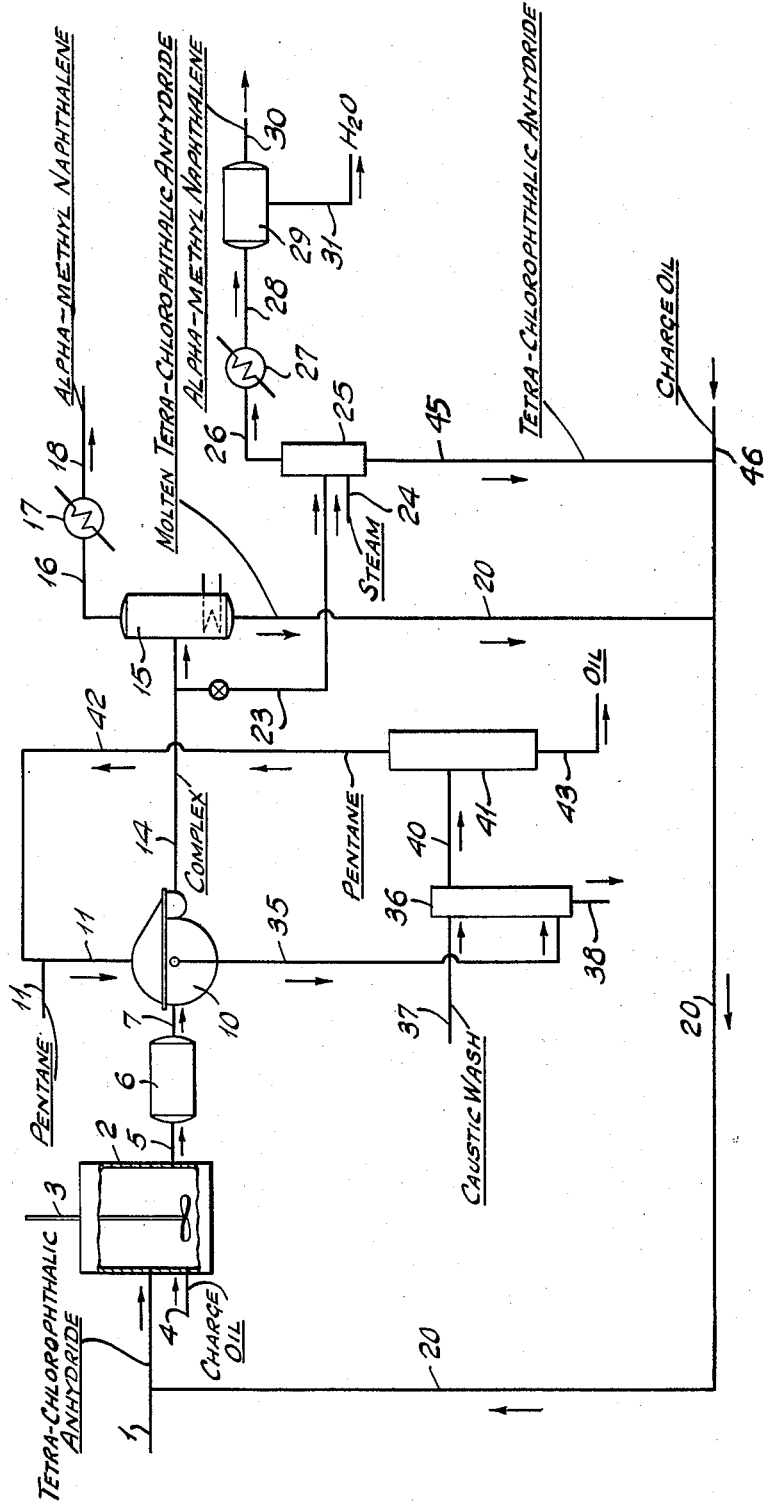

2,914,581
Patented Nov. 24, 1959

2,914,581

PROCESS FOR FRACTIONATING MIXTURES CONTAINING ALPHA- AND BETA-MONOSUBSTITUTED NAPHTHALENES UTILIZING TETRAHALOPHTHALIC ANHYDRIDES

Edward R. Christensen, Beacon, and Stanley A. Francis, Glenham, N.Y., assignors to Texaco Inc., a corporation of Delaware Application August 2, 1954, Serial No. 447,158

9 Claims. (Cl. 260—674)

This invention relates to a method for fractionating mixtures of monosubstituted naphthalenes. More particularly, this invention relates to a method for fractionating mixtures containing alpha- and beta-monosubstituted naphthalenes.

Alpha- and beta-monosubstituted naphthalenes are particularly useful in commerce for the preparation of naphthol dyes, reference fuels, chemical intermediates, and the like. For example, a mixture of alpha- and beta-methylnaphthalene is used as a reference fuel for diesel engines. It is desirable therefore, that there be available a convenient method for the separation and recovery of substantially pure alpha-monosubstituted naphthalene and beta-monosubstituted naphthalene from mixtures containing the same. The separation of these materials, such as alpha-methylnaphthalene and beta-methylnaphthalene by conventional methods, such as by distillation, is difficult and time consuming in view of the fact that these compounds have very similar boiling points. Similarly, the recovery of alpha naphthol and beta naphthol from mixtures containing the same by conventional methods, such as by distillation, is time consuming and difficult in view of the very similar boiling points of these compounds.

Accordingly, it is the object of the invention to provide a method for the recovery of alpha-monosubstituted naphthalenes from mixtures containing the same together with beta-monosubstituted naphthalenes.

It is another object of this invention to provide an improved method for the fractionating mixtures containing alpha- and beta-monosubstituted naphthalenes whereby substantially pure alpha- or beta-monosubstituted naphthalene is obtainable.

It is another object of this invention to provide an improved method for fractionation of mixtures containing alpha- and beta-methylnaphthalenes whereby a substantially pure alpha-methylnaphthalene product is recovered.

These and other objects of this invention and how they are accomplished will become apparent in the light of the accompanying description and drawing which illustrates a practice of this invention.

It has now been discovered a tetrahalophthalic anhydride preferentially forms a complex with an alpha-monosubstituted naphthalene over a beta-monosubstituted naphthalene. Accordingly, in one practice of this invention a mixture containing alpha- and beta-monosubstituted naphthalenes is fractionated by contacting said mixture with tetrachlorophthalic anhydride whereby the alpha-monosubstituted naphthalene constituent of said mixture produces a complex with said added tetrachlorophthalic anhydride. The resulting complex is separated from the mixture and is decomposed to yield a product having an increased proportion of alpha-monosubstituted naphthalene with respect to the original aforesaid mixture.

The resulting formed crystalline complex is composed of equi-molar amounts of alpha-monosubstituted naphthalene and tetrachlorophthalic anhydride. The complex is substantially insoluble in hydrocarbon liquid at atmospheric temperature and accordingly can be readily separated therefrom. After separation of the complex, the alpha-monosubstituted naphthalene constituent thereof is recovered by heating the complex whereby it decomposes into its constituents which are separated one from another. Separation of the solid complex from hydrocarbon solutions is advantageously effected at a temperature below 150° F., and ordinarily at a temperature between 50 and 125° F. at which temperatures the complex is especially insoluble in hydrocarbon liquids. Decomposition of the complex into its constituents is effected at a temperature over 200° F., ordinarily at a temperature in the range 250–500° F.

Tetrachlorophthalic anhydride, tetrabromophthalic anhydride, tetraiodophthalic anhydride and tetrafluorophthalic anhydride or mixtures thereof may be employed as the complexing agent in the process of this invention. Tetrachlorophthalic anhydride is most frequently employed, however, since it is readily available and is cheapest of the tetrahalophthalic anhydrides. In the following description, tetrachlorophthalic anhydride will ordinarily be used to exemplify the process of this invention.

The process of this invention, as previously indicated, is applicable to the separation of mixtures containing alpha- and beta-monosubstituted naphthalenes having substantially the same boiling points. For example, by employing the practice of this invention alpha-methylnaphthalene is separated from mixtures containing the same in the presence of beta-methylnaphthalene. The process of the invention is generally applicable to the fractionation of mixtures containing alpha- and beta-monosubstituted naphthalenes, especially mixtures containing isomeric alpha- and beta-monosubstituted naphthalenes. More particularly, the practice of this invention is applicable for the separation and recovery of substantially pure alpha-monosubstituted naphthalenes and for the fractionation of the following mixtures: mixtures containing alpha- and beta-monoalkyl substituted naphthalenes, such as alpha- and beta-methylnaphthalenes, or alpha- and beta-ethylnaphthalenes; mixtures containing alpha- and beta-naphthoic acids; mixtures containing alpha- and beta-naphthalene sulfonates; mixtures containing alpha- and beta-chloronaphthalenes; and the like.

In the practice of this invention for recovery of alpha-monosubstituted naphthalenes from a mixture containing the same in the presence of a beta-monosubstituted naphthalene it is preferred that the amount of complexing tetrahalophthalic anhydride such as tetrachlorophthalic anhydride added thereto be not in excess of that amount necessary to form an equimolecular complex with the alpha-monosubstituted naphthalene constituents contained in said mixture. Accordingly, and exemplary of the practice of this invention, in the fractionation of a mixture containing 60 mols of alpha-monosubstituted naphthalene and 40 mols of beta-monosubstituted naphthalene, it is preferred to contact said mixture with an amount of tetrachlorophthalic anhydride not greater than 60 mols, i.e., just sufficient to form only a complex with the alpha-monosubstituted naphthalene constituents of said mixture.

The contacting step of this invention is effected with thorough mixing of the complexing agent and the mixture containing the alpha- and beta-monosubstituted naphthalenes. A preferred method of insuring thorough contacting of the complexing agent with the mixture to be fractionated is to contact the organic mixture with the complexing agent at a temperature above 300° F. and preferably at a temperature between 325 and 400° F. At these temperatures the complexing agent is soluble in most hydrocarbon mixtures which might contain the alpha- and beta-monosubstituted naphthalenes. Thorough mixing and contacting of the mixture and complexing agent is efficiently realized by dissolving the complexing agent in the mixture. Upon cooling the mixture containing dissolved complexing agent to a temperature between 50 and 150° F., the resulting crystalline complex of the alpha-monosubstituted naphthalene and tetrachlorophthalic anhydride separates out as a golden yellow solid.

It is also feasible to effect complex formation by slurrying solid tetrachlorophthalic anhydride with thorough agitation in the mixture to be fractionated at atmospheric temperature. In such instances, longer contact time and more vigorous agitation is required in order to effect the same degree of complex formation and separation that is effected by the above-disclosed procedure involving solution of the complexing agent at elevated temperature in the mixture to be fractionated.

A third alternative involves liquid-liquid contact and comprises contacting a saturated solution of the complexing agent in a solvent, such as acetone, with the mixture to be fractionated. A drawback attendant on the use of the liquid-liquid type system is that presence of the solvent introduces a third component into the system, the recovery of which necessitates additional treating steps.

The solid complex is readily separated from the resulting admixture. Filtration, decantation or centrifugal separators may be used to effect removal of the complex. Filtration is the most commonly used method for effecting this separation. In large scale operations rotary filters, such as are employed in solvent dewaxing procedures, provide a very efficient means for separating the complex. Separation of the complex from the treated mixture is ordinarily effected at a temperature below about 150° F.; temperatures between about 50 and 125° F. have proven to be particularly effective for this separation.

After separation has been effected, it is advisable to wash the complex with a light hydrocarbon solvent in order to remove the physically absorbed liquid mixture from the complex. Pentane is an excellent wash solvent.

The separated complex is decomposed into its components by heating to a temperature in the range 200 and 500° F. Several techniques may be employed to effect complex decomposition. The preferred procedure involves straight heat stripping which comprises heating the complex to a temperature between about 250 and 500° F. whereby the complex is decomposed and the alpha-monosubstituted naphthalene obtained as a distillate. The tetrahalophthalic anhydride in molten form may thus be recycled to the contacting zone.

Another complex decomposition procedure involves contacting the complex with steam at a temperature above about 300° F. whereby there is obtained a distillate comprising the alpha-monosubstituted naphthalene and water. Tetrahalophthalic anhydrides are not hydrolyzed at temperatures above about 300° F. so that anhydride is recovered from the steam distillation zone for recycling to the contacting zone. This procedure provides a neat method of breaking the complex since both the alpha-monosubstituted naphthalene and tetrachlorophthalic anhydride are recovered in a form suitable for further use.

A third procedure for decomposing the complex involves heating the complex in the presence of a solvent for polycyclic aromatic compounds, particularly hydrocarbons, such as naphtha, whereby the complex decomposes and there are formed two layers, one consisting of a complexing agent and the other of a solution of the alpha-monosubstituted naphthalene in a solvent. A temperature of about 200° F. to 400° F. should be employed in order to decompose the complex with a solvent. Accordingly, if low boiling naphtha is used as a solvent, it may be necessary to use superatmospheric pressure in order to maintain the necessary decomposition temperature. The recovered alpha-monosubstituted naphthalene can be separated from the naphtha solution by stripping.

In the accompanying drawing there is presented a flow diagram of a preferred procedure for effecting the process of the subject invention. For purposes of explanation the process is applied to the separation of alpha-methylnaphthalene from an oil such as cracked distillate which also contains beta-methylnaphthalene.

Through pipe 1 tetrachlorophthalic anhydride is introduced into a mixing vessel 2 fitted with stirring means 3. In the mixing vessel 2 the complexing agent is contacted with charge oil which is introduced therein through a line 4. The mixing vessel 2 is maintained at a temperature of about 350° F. at which temperature tetrachlorophthalic anhydride dissolves in the oil from which alpha-methylnaphthalene is to be separated.

After thorough mixing in the mixing vessel 2 the mixture of complexing agent and charge oil is introduced through a pipe 5 into a cooling vessel 6 wherein the treated mixture is cooled to a temperature below 150° F. and a solid complex of tetrachlorophthalic anhydride and alpha-methylnaphthalene settles out. The composite mixture advantageously at a temperature in the range 50 to 150° F. is introduced through a pipe 7 into a rotary filter 10, wherein the complex is separated from the treated mixture. Means are provided in the rotary filter for continual removal of the complex from the filter drum. Means are also provided for continual washing of the complex cake on the filter drum with a hydrocarbon solvent, for example pentane, which is introduced into the rotary filter through a pipe 11. The complex is removed from the rotary filter 10 through a conduit 14 which can be equipped with a screw type conveyor in order to facilitate movement of complex therethrough.

The complex is introduced into a vessel 15 wherein it is heated to a temperature of about 500° F. At this temperature the complex decomposes and alpha-methylnaphthalene distills off through the pipe 16 and passes through an exchanger 17 in which condensation of the alpha-methylnaphthalene is effected. The alpha-methylnaphthalene passes to storage or to further chemical reaction through a pipe 18.

Molten tetrachlorophthalic anhydride is withdrawn from the vessel 15 through a conduit 20 and is returned therethrough to the mixing vessel 2. In order to avoid crystallization of the tetrachlorophthalic anhydride in the pipe 20, it is desirable to enclose pipe 20 in a steam jacket.

In practice the mixing vessel 2 and the vessel 15 are situated near one another so that the pipe 20 is of very short length.

An alternative method of decomposing the complex is also shown in the drawing. This alternative procedure involves steam distilling the complex at a temperature in the range 250–400° F. or higher. When this alternative procedure is employed, the complex is introduced through pipes 14 and 23 into a distillation vessel 25 into which superheated steam is introduced through a pipe 24.

The complex is decomposed on steam distillation and there is obtained a distillate comprising steam and alpha-methylnaphthalene which is taken off overhead through a pipe 26. After condensation in the exchanger 27, the distillate is introduced into a separator 29 wherein the condensed alpha-methylnaphthalene is separated from water. Water is withdrawn from the separator 29 through a pipe 31 and alpha-methylnaphthalene is withdrawn from the separator 29 through a pipe 30.

Tetrachlorophthalic anhydride is withdrawn from the distillation vessel 25 through the pipe 45 and is recycled to the mixing vessel 2 through pipes 45 and 20. Charge oil can be introduced through a pipe 46 to act in this instance as a carrier for returning the complexing agent to the mixing vessel 2.

The filtrate obtained from filter 10 comprises cycle oil substantially free of alpha-methylnaphthalene; it is withdrawn from the rotary filter 10 through a pipe 35 and is introduced into a wash tower 36. The wash liquor obtained by washing the complex with pentane is combined with the filtrate and flows into tower 36 through the pipe 35. Combined filtrate and pentane wash are contacted with dilute caustic, for example, 3 percent sodium hydroxide in wash tower 36. The caustic wash frees the oil of residual quantities of tetrachlorophthalic anhydride. The caustic wash is removed from the tower 36 through a pipe 38.

The washed oil is introduced through a pipe 40 into a stabilizer 41 wherein it is freed from pentane which is taken off overhead from the stabilizer 41 and is recycled through a pipe 42 to the rotary filter 10. The cycle oil freed of its content of alpha-methylnaphthalene is removed from the stabilizer 41 through a pipe 43.

The following is illustrative of a method of separation in accordance with this invention directed to the separation and recovery of alpha-methylnaphthalene. A mixture of alpha- and beta-methylnaphthalenes was diluted by the addition thereto of a suitable hydrocarbon diluent such as isooctane and contacted with added solid tetrachlorophthalic anhydride. The resulting admixture was agitated for a suitable period of time to form the resulting solid complex. The solid complex was removed by filtration and decomposed by suitable means to recover a product having an increased proportion of alpha-methylnaphthalene relative to the aforesaid mixture. The actual test results are set forth in accompanying Table No. 1.

lenes which comprises contacting said mixture with tetrachlorophthalic anhydride in a molar amount not in excess of the number of mols of the alpha-monosubstituted naphthalenes contained in said mixture under complex forming conditions whereby said tetrachlorophthalic anhydride preferentially forms a complex with said alpha-monosubstituted naphthalene, removing the resulting formed complex, decomposing said complex and recovering therefrom a product having an increased proportion of alpha-monosubstituted naphthalene relative to the aforesaid mixture.

3. A process for fractionating a mixture containing predominantly alpha- and beta-monosubstituted naphthalenes to produce a product having an increased proportion of alpha-monosubstituted naphthalene which comprises contacting said mixture with a molar amount of a tetrahalophthalic anhydride not in excess of the number of mols of said alpha-monosubstituted naphthalene present in the aforesaid mixture, forming a complex consisting of equimolar amounts of tetrahalophthalic anhydride and alpha-monosubstituted naphthalene, removing the resulting formed complex and decomposing said complex and to produce a product having an increased proportion of alpha-monosubstituted naphthalene relative to the aforesaid mixture.

4. A method for fractionating a mixture containing alpha- and beta-methylnaphthalenes which comprises contacting said mixture with a molar amount of a tetrahalophthalic anhydride not in excess of the number of mols of said alpha-methylnaphthalene contained in said

TABLE NO. 1

*Tetrachlorophthalic anhydride fractional complexing for separation of alpha-monosubstituted naphthalenes*

|  | Run No. 1 | Run No. 2 | Run No. 3 | Run No. 4 | Run No. 5 |
|---|---|---|---|---|---|
| Mixed Alpha- and Beta-methylnaphthalenes: | | | | | |
| Charge, Wt. g | 100 | 200 | 142 | 142 | 100 cc. |
| Moles | 0.705 | 1.410 | 1.00 | 1.00 | |
| Tetrachlorophthalic: | | | | | |
| Charge, Wt. g | 95 | 200 | 150 | 300 | 114. |
| Moles | 0.332 | 0.700 | 0.525 | 1.050 | 0.390. |
| Temperature, °F | 80 | 80 | 150 | 150 | 245. |
| Diluent | 250 cc. isooctane | 500 cc. benzene | 850 cc. naphtha | 850 cc. naphtha | 400 cc. isooctane. |
| Time | 10 min | 2 hr | 1.5 hr | 3.0 hr | 8.0 hr. |
| Method of Complex Breaking | Acetone washing | Steam distillation | Steam distillation | Steam distillation | Dissolution in dilute $NH_4OH$. |
| Wt. Percent of Charge: | | | | | |
| Uncomplexed | 91 | 72 | 77.0 | 43.7 | [2] 59.0. |
| Complexed | 11 | 20 | 15.5 | 47.2 | [2] 30.0. |
| Monomethylnaphthalenes: | | | | | |
| Analysis [1]— | | | | | |
| Charge: | | | | | |
| Alpha | 56.9 | 56.9 | 56.9 | 56.9 | 56.4. |
| Beta | 36.0 | 36.0 | 36.0 | 36.0 | 34.0. |
| Uncomplexed: | | | | | |
| Alpha | 46.0 | | 40.9 | 24.7 | 44.1. |
| Beta | 33.8 | | 37.9 | 58.3 | 50.7. |
| Complexed: | | | | | |
| Alpha | 72.7 | 87.0 | 85.0 | 77.9 | 87.6. |
| Beta | 18.2 | 9.2 | 10.5 | 17.4 | 10.9. |

[1] Mole percent.
[2] Volume percent.

Obviously, many modifications and variations of this invention as hereinbefore set forth may be made without departing from the spirit and scope thereof.

We claim:

1. A method for fractionating a mixture containing alpha- and beta-monosubstituted naphthalenes which comprises contacting said mixture with a tetrahalophthalic anhydride in a molar amount not in excess of the number of mols of the alpha-monosubstituted naphthalenes contained in said mixture under complex forming conditions, removing the resulting formed complex and decomposing said complex to recover a product having an increased proportion of alpha-monosubstituted naphthalene relative to the aforesaid mixture.

2. A method of fractionating a mixture consisting essentially of alpha- and beta-monosubstituted naphtha-mixture, recovering the resulting formed complex and decomposing said complex to form a product having an increased proportion of alpha-methylnaphthalene relative to the aforesaid mixture.

5. A method in accordance with claim 4, wherein said tetrahalophthalic anhydride is tetrachlorophthalic anhydride.

6. A process for fractionating a mixture consisting essentially of alpha- and beta-methylnaphthalenes which comprises contacting said mixture with a molar amount of tetrachlorophthalic anhydride not in excess of the number of mols of said alpha-methylnaphthalene contained in said mixture, forming a complex consisting mainly of said tetrachlorophthalic anhydride and alpha-methylnaphthalene, separating said complex in solid form, and decomposing said complex by contacting with steam at an elevated temperature to produce a product having an increased proportion of alpha-methylnaphthalene with respect to the aforesaid mixture.

7. A method for removing alpha-monosubstituted naphthalenes from a mixture containing the same in the presence of beta-monosubstituted naphthalene which comprises contacting said mixture with tetrachlorophthalic anhydride in a molar amount not in excess of the number of mols of the alpha-monosubstituted naphthalenes contained in said mixture at a temperature sufficient to dissolve said anhydride in said mixture, cooling the resulting mixture to a temperature below 150° F. whereby a solid complex consisting mainly of tetrachlorophthalic anhydride and alpha-monosubstituted naphthalene is formed, separating the said complex and decomposing said complex to produce a product having an increased proportion of alpha-monosubstituted naphthalene with respect to the aforesaid mixture.

8. A process in accordance with claim 7 wherein said alpha- and beta-monosubstituted naphthalenes are alpha- and beta-methylnaphthalenes.

9. A method of separating a mixture containing isomeric alpha- and beta-monosubstituted naphthalenes which comprises contacting said mixture with a molar amount of tetra-chlorophthalic anhydride not in excess of the number of mols of said alpha-monosubstituted naphthalene contained in said mixture, recovering a complex comprising predominantly tetrachlorophthalic anhydride and alpha-monosubstituted naphthalene from the resulting mixture, decomposing said complex and recovering a product having a substantially increased proportion of alpha-monosubstituted naphthalene with respect to the aforesaid mixture.

References Cited in the file of this patent

UNITED STATES PATENTS 2,652,436     Hess et al. _____ Sept. 15, 1953

OTHER REFERENCES

Pfeiffer et al.: Berichte, 55B, pp. 413–29 (1922), vol. 16.

Buu-Hoi et al.: Compt. Rend., pages 1056–58 (1952), vol. 234.